US010427555B2

(12) United States Patent
Abe et al.

(10) Patent No.: US 10,427,555 B2
(45) Date of Patent: *Oct. 1, 2019

(54) CONVEYANCE SEAT

(71) Applicant: TS TECH CO., LTD., Asaka-shi, Saitama (JP)

(72) Inventors: Ryuzaburo Abe, Tochigi (JP); Takayuki Inose, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 54 days.

This patent is subject to a terminal disclaimer.

(21) Appl. No.: 15/890,612

(22) Filed: Feb. 7, 2018

(65) Prior Publication Data

US 2018/0236901 A1 Aug. 23, 2018

(30) Foreign Application Priority Data

Feb. 21, 2017 (JP) .................................. 2017-030390

(51) Int. Cl.
*B60N 2/02* (2006.01)
*A47C 7/14* (2006.01)

(52) U.S. Cl.
CPC .............. *B60N 2/0284* (2013.01); *A47C 7/14* (2013.01)

(58) Field of Classification Search
CPC ................................ B60N 2/0284; A47C 7/14
USPC ..................................................... 297/284.11
See application file for complete search history.

(56) References Cited

U.S. PATENT DOCUMENTS

| 6,106,063 | A  | * | 8/2000  | Dauphin     | A47C 1/023  |
|           |    |   |         |             | 297/284.1   |
| 7,597,398 | B2 | * | 10/2009 | Lindsay     | B60N 2/0224 |
|           |    |   |         |             | 297/283.2   |
| 7,669,929 | B2 | * | 3/2010  | Simon       | B60N 2/0224 |
|           |    |   |         |             | 297/284.11  |
| 9,016,785 | B2 | * | 4/2015  | Freisleben  | B60N 2/0232 |
|           |    |   |         |             | 297/284.11  |

(Continued)

FOREIGN PATENT DOCUMENTS

DE    4423926 A1 *  1/1996 ............... B60N 2/62
DE   199 43 707 A1   3/2001

(Continued)

OTHER PUBLICATIONS

Extended European Search Report issued in related application EP 18156233.1, dated Jun. 21, 2018, 5 pages.

*Primary Examiner* — Milton Nelson, Jr.
(74) *Attorney, Agent, or Firm* — Drinker Biddle & Reath LLP

(57) ABSTRACT

Improvement is made in a configuration of a movable portion movable to adjust a length of a seat cushion. A vehicle seat includes a seat cushion having a fixed portion and a movable portion movable relative to the fixed portion for adjustment of a length of the seat cushion, and also includes a notch arranged on the movable portion as a movable portion side engagement portion and an engagement plate piece arranged on the fixed portion as a fixed portion side engagement portion. The engagement plate piece is movable between i) a locking position engaged with the notch to bring the movable portion into an unmovable state, and ii) an unlocking position released from the notch to bring the movable portion into a movable state. The movable portion includes a pressing wire to move the (Continued)

engagement plate piece from the locking position to the unlocking position.

8 Claims, 16 Drawing Sheets

(56) References Cited

U.S. PATENT DOCUMENTS

| | | | |
|---|---|---|---|
| 9,809,132 B2* | 11/2017 | Bortolon | ............ B60N 2/62 |
| 2007/0090673 A1 | 4/2007 | Ito | |
| 2010/0109401 A1 | 5/2010 | Booth et al. | |

FOREIGN PATENT DOCUMENTS

| | | |
|---|---|---|
| DE | 10 2006 050 614 A1 | 5/2007 |
| JP | 2007-118706 A | 5/2007 |

* cited by examiner

CONVEYANCE SEAT

CROSS REFERENCE TO RELATED APPLICATIONS

This application is based upon and claims the priority benefit of Japanese Patent Application No. JP 2017-030390, filed Feb. 21, 2017, the contents being incorporated herein by reference.

BACKGROUND

The present disclosure relates to a conveyance seat and particularly relates to a conveyance seat configured for adjustment of a length of a seat cushion by moving a movable portion of the seat cushion.

In some conveyance seats, a length of a seat cushion can be adjusted by moving a movable portion installed in the seat cushion. For example, a vehicle seat described in Japanese Patent Publication JP 2007-118706 A, which includes a moving mechanism in a seat cushion, is capable of adjusting a front to back length of the seat cushion (a length of the vehicle seat in a front to back direction) by moving the moving mechanism in the front to back direction.

In the configuration having the above-mentioned movable portion installed in the seat cushion, a locking mechanism may be provided to prevent the movable portion from being accidentally moved. In such a case, the movable portion and a fixed portion arranged on a seat cushion frame are each provided with an engagement portion for locking. The engagement portions installed to the movable portion and the fixed portion can be engaged with each other, and their engagement state can be also released. That is, one engagement portion is moved between a position of engaging with the other engagement portion (a locking position) and a position separated from the other engagement portion (an unlocking position).

In this configuration, when the engagement portion movable between the locking position and the unlocking position is installed to the movable portion between the movable portion and the fixed portion, the seat needs to be designed to prevent the above-mentioned engagement portion from interfering with its surrounding members during the movement of the movable portion. Further, the above-mentioned engagement portion includes a mechanism for moving between the locking position and the unlocking position. Thus, the movable portion installed with the above-mentioned engagement portion increases its number of components and weight correspondingly.

SUMMARY

The present disclosure has been implemented in view of the problems described above, and an embodiment of the present disclosure provides a conveyance seat in which a configuration of a movable portion that is moved to change a length of a seat cushion is improved.

According to the present disclosure, the above problem can be solved by an embodiment of a conveyance seat including a seat cushion having a fixed portion arranged on a seat cushion frame and a movable portion that is movable relative to the fixed portion for adjustment of a length of the seat cushion, in which the conveyance seat further includes a movable portion side engagement portion arranged on the movable portion and fixed relative to the movable portion, a fixed portion side engagement portion installed on the fixed portion, configured to move between a locking position where the fixed portion side engagement portion engages with the movable portion side engagement portion to bring the movable portion into an unmovable state and an unlocking position where the fixed portion side engagement portion is released from the movable portion side engagement portion to bring the movable portion into a movable state, and a driving portion, arranged on the movable portion, for moving the fixed portion side engagement portion from the locking position to the unlocking position.

The conveyance seat of the present disclosure having the above configuration includes two engagement portions to restrict the movement of the movable portion. Between them, the engagement portion configured to move between the locking position and the unlocking position is arranged on the fixed portion. This can prevent the increase of the number of components and the weight of the movable portion and improve the degree of freedom in designing the movable portion.

Further, it is preferred that, in the above-mentioned conveyance seat, respective combinations of the movable portion side engagement portion and the fixed portion side engagement portion are provided at a plurality of positions in a width direction of the conveyance seat. In the above configuration, a plurality of mechanisms (that is, the combinations of the movable portion side engagement portion and the fixed portion side engagement portion) for restricting the movement of the movable portion are provided. This enables effective restriction of the movement of the movable portion.

Further, it is preferred that, in the above-mentioned conveyance seat, the movable portion includes a rod movable in the front to back direction to adjust the length of the seat cushion in the front to back direction of the conveyance seat, the rod is a columnar or cylindrical-shaped member elongated in the front to back direction, and the movable portion side engagement portion is arranged on the rod. In the above configuration, the front to back length of the cushion is changed by moving the columnar or cylindrical-shaped rod in the front to back direction. Such a configuration enables to adjust the front to back length of the cushion by using the rod having a general shape.

Further, it is preferred that, in the above-mentioned conveyance seat, the rod includes a first rod and a second rod, which are arranged separated from each other in the width direction of the conveyance seat, the first rod is bent towards the second rod in the width direction, and the second rod is bent towards the first rod in the width direction. In the above configuration, the two rods (the first rod and the second rod) are bent towards each other. This provides a reduction in rattling of the rods in motion and prevent the rods from interfering with their surrounding members.

Further, it is preferred that, in the above-mentioned conveyance seat, the movable portion side engagement portion is a notch formed on an outer peripheral surface of the rod, the notch includes in its interior a first surface and a second surface that face each other in the front to back direction and are arranged adjacently to each other at a bottom portion of the notch, the first surface extends along a plane having its normal direction in the front to back direction, and the second surface is inclined to be positioned on an outer side in a radial direction of the rod as the second surface goes from an end of the second surface adjacent to the first surface toward the other end opposite to the first surface. In the above configuration, the notch functioning as the movable portion side engagement portion is formed on the outer peripheral surface of the rod. Further, one surface (the first surface) of the two opposing surfaces included in the notch is orthogonal to the front to back direction. The other surface (the second surface) is inclined to be positioned on the outer side in the radial direction of the rod as separating from the first surface. In such a configuration, the movement of the movable portion can be restricted by a locking function of the engagement portion in a direction from the first surface toward the second surface in the front to back direction. On the other hand, the locking function can be disabled to freely move the movable portion in a direction from the second surface toward the first surface. That is, the above configuration enables to restrict the movement of the movable portion only in one direction in the front to back direction.

Further, it is preferred that, in the above-mentioned conveyance seat, the fixed portion has a guide portion configured to guide the movable portion when the movable portion is moved, and the guide portion includes the fixed portion side engagement portion. In the above configuration, providing the guide portion for guiding the movable portion allows the smooth movement of the movable portion. Further, providing the fixed portion side engagement portion to the guide portion enables to simplify the seat configuration as compared with a configuration where the guide portion and the fixed portion side engagement portion are separated.

Further, it is preferred that, in the above-mentioned conveyance seat, the guide portion is elongated along a moving direction of the movable portion. In the above configuration, the guide portion is elongated along the moving direction of the movable portion, thus rattling of the movable portion in motion can be effectively suppressed.

Further, it is preferred that, in the above-mentioned conveyance seat, the movable portion is movable in the front to back direction of the conveyance seat to adjust the length of the seat cushion, the conveyance seat includes an operation portion that is operated to move the fixed portion side engagement portion from the locking position to the unlocking position by the driving portion, and the operation portion, when operated, rotates around a shaft along the width direction of the conveyance seat. In the above configuration, the movable portion is moved in the front to back direction. Further, in order to move the fixed portion side engagement portion from the locking position to the unlocking position, the operation portion is operated to rotate around a shaft along the width direction of the conveyance seat. That is, the above configuration allows the operation of the operation portion along the moving direction of the movable portion, thereby facilitating the operation (the operation of the operation portion) for moving the movable portion.

According to the conveyance seat of the present disclosure, two engagement portions are provided to restrict the movement of the movable portion. Between them, the engagement portion configured to move between the locking position and the unlocking position is arranged on the fixed portion. This can prevent the increase of the number of components and the weight of the movable portion and improve the degree of freedom in designing the movable portion. Further, according to the conveyance seat of the present disclosure, providing a plurality of the mechanisms (that is, the combinations of the movable portion side engagement portion and the fixed portion side engagement portion) for restricting the movement of the movable portion enables to effectively restrict the movement of the movable portion. Further, according to the conveyance seat of the present disclosure, the front to back length of the cushion can be adjusted by using a general rod having a columnar or cylindrical shape. Further, according to the conveyance seat of the present disclosure, the two rods (the first rod and the second rod) are bent towards each other. This provides reduced rattling of the rods in motion and prevents the rods from interfering with their surrounding members. Further, according to the conveyance seat of the present disclosure, the notch functioning as the movable portion side engagement portion is formed on the outer peripheral surface of the rod. One surface (the first surface) of the two facing surfaces included in the notch is orthogonal to the front to back direction, and the other surface (the second surface) is inclined to be positioned on the outer side in the radial direction of the rod as separating from the first surface. This allows restriction of the movement of the movable portion only in one direction (the direction from the first surface to the second surface) in the front to back direction. Further, according to the conveyance seat of the present disclosure, the fixed portion side engagement portion is provided to the guide portion for guiding the movable portion. Thus, the movable portion can be moved smoothly and the seat configuration can be simplified. Further, according to the conveyance seat of the present disclosure, the guide portion is elongated along the moving direction of the movable portion. Thus, rattling of the movable portion in motion can be effectively suppressed. Further, according to the conveyance seat of the present disclosure, the operation portion is operated along the moving direction of the movable portion for moving the fixed portion side engagement portion from the locking position to the unlocking position. This can facilitate the operation (the operation of the operation portion) for moving the movable portion.

BRIEF DESCRIPTION OF THE DRAWINGS

Various embodiments of the invention are illustrated in the drawings, in which.

DETAILED DESCRIPTION

An embodiment (the present embodiment) of the present disclosure is described below. A seat equipped in a vehicle (a vehicle seat) is used as an example to describe a conveyance seat according to the present embodiment below. However, the present disclosure can be applied to the conveyance seats other than the vehicle seat, for example, seats equipped in a ship and an airplane.

Note that, in the following description, a "front to back direction" signifies a front to back direction of the vehicle seat and corresponds to an advancing direction of the traveling vehicle. Further, a "seat width direction" signifies a width direction of the vehicle seat and corresponds to a right and left direction as viewed from an occupant sitting on the vehicle seat. Further, an "up and down direction" signifies an up and down direction of the vehicle seat and corresponds to a vertical direction of the vehicle traveling on a horizontal surface.

Further, a shape, position, attitude, and the like of each portion of the seat described below are, unless particularly stated otherwise, conditions of the vehicle seat in a normal state (an initial state of the vehicle seat, where each portion of the seat is at an initial position).

Basic Configuration of Vehicle Seat According to the Present Embodiment

Figure 1:
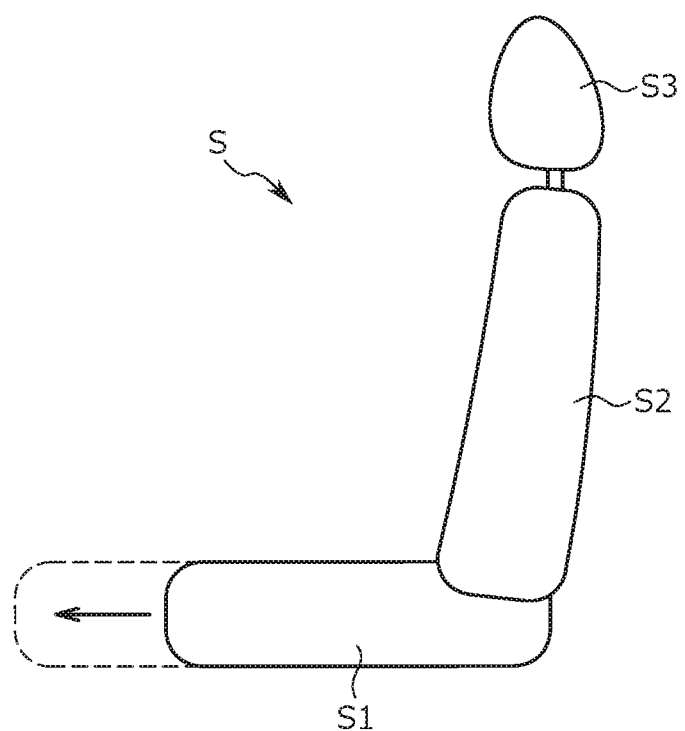
FIG. 1 is a schematic side view of a conveyance seat according to an embodiment of the present disclosure.
Figure 2:
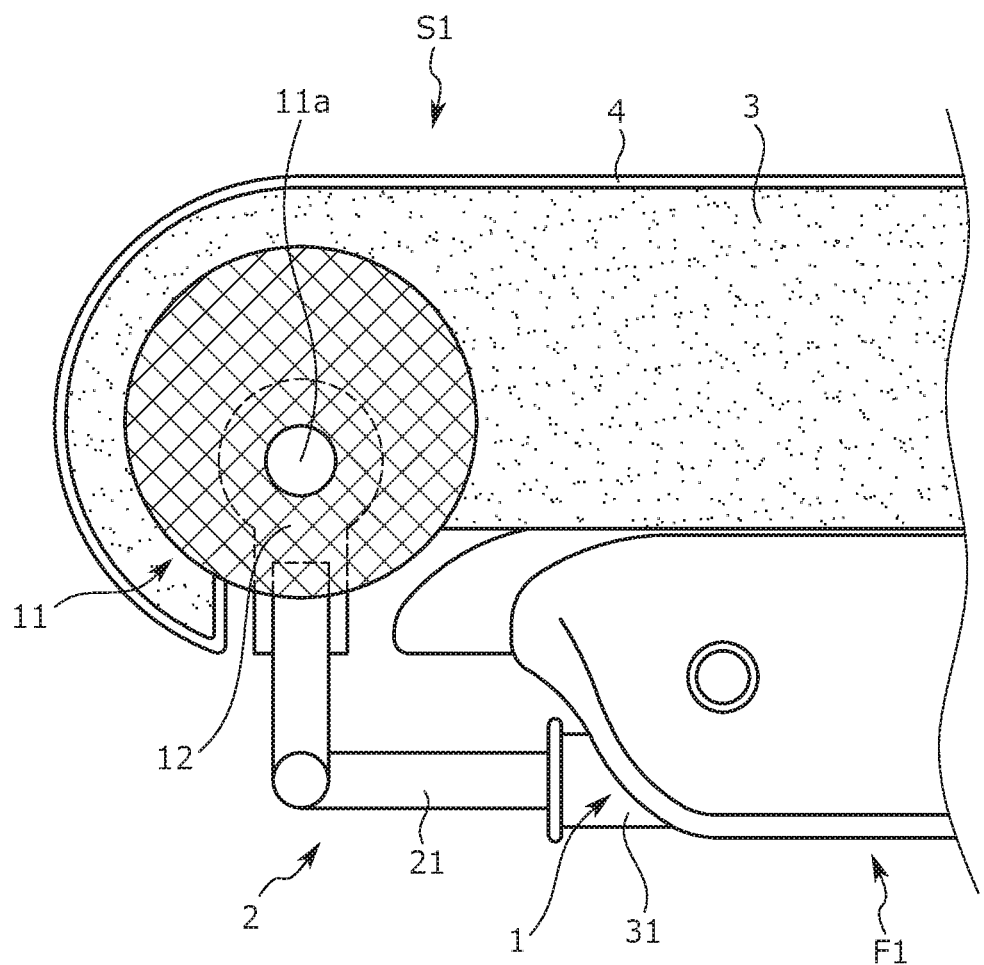
FIG. 2 is a partial schematic side view of a seat cushion frame of the conveyance seat of FIG. 1, according to an embodiment.

First, a basic configuration of a vehicle seat (hereinafter, referred to as a vehicle seat S) according to the present embodiment is described with reference to FIG. 1 and FIG. 2. As shown in FIG. 1, the vehicle seat S includes a seat cushion S1, a seat back S2, and a headrest S3. The seat cushion S1 is configured by mounting a pad material 3 made of urethane or the like on a seat cushion frame F1 shown in FIG. 2 and covering the pad material 3 with a cover material 4.

Further, the seat cushion S1 according to the present embodiment is configured such that a front and back length (i.e., a length in a front and back direction) is adjustable by changing a front end position of the seat cushion S1. More specifically, the seat cushion S1 includes the above-mentioned seat cushion frame F1 in its interior. A front side portion of the seat cushion frame F1 is in a state of being fixed without being movable in the front and back direction for adjustment in the front and back length of the seat cushion S1. That is, the front side portion of the seat cushion frame F1 is a fixed portion 1 of the present embodiment.

On the other hand, the seat cushion S1 includes a movable portion 2 movable in the front and back direction in its interior. The movable portion 2 is held by the fixed portion 1 with a portion of the movable portion 2 located at a front end of the seat cushion S1. Then, when the movable portion 2 is moved in the front and back direction relative to the fixed portion 1 as shown in FIG. 2, the front and back length of the seat cushion S1 is changed as shown in FIG. 1. That is, the movable portion 2 is moved in the front and back direction to change the front and back length of the seat cushion S1. Note that the front and back direction corresponds to a moving direction of the movable portion 2.

Movable Portion

Next, a configuration of the movable portion 2 is described with reference to FIG. 3, FIG. 4, FIG. 5A, FIG. 5B, and FIG. 6. Note that, in order to comprehensively illustrate the movable portion 2 and a guide portion 31 described below, components arranged on the peripheries of the movable portion 2 and the guide portion 31 are not shown in FIG. 5A and FIG. 5B unless they are related to the movable portion 2. Further, a roller portion 11 is shown in FIG. 4 and FIG. 6 in a state in which an outer peripheral portion (a roller body portion) is removed from the roller portion 11.

Figure 3:
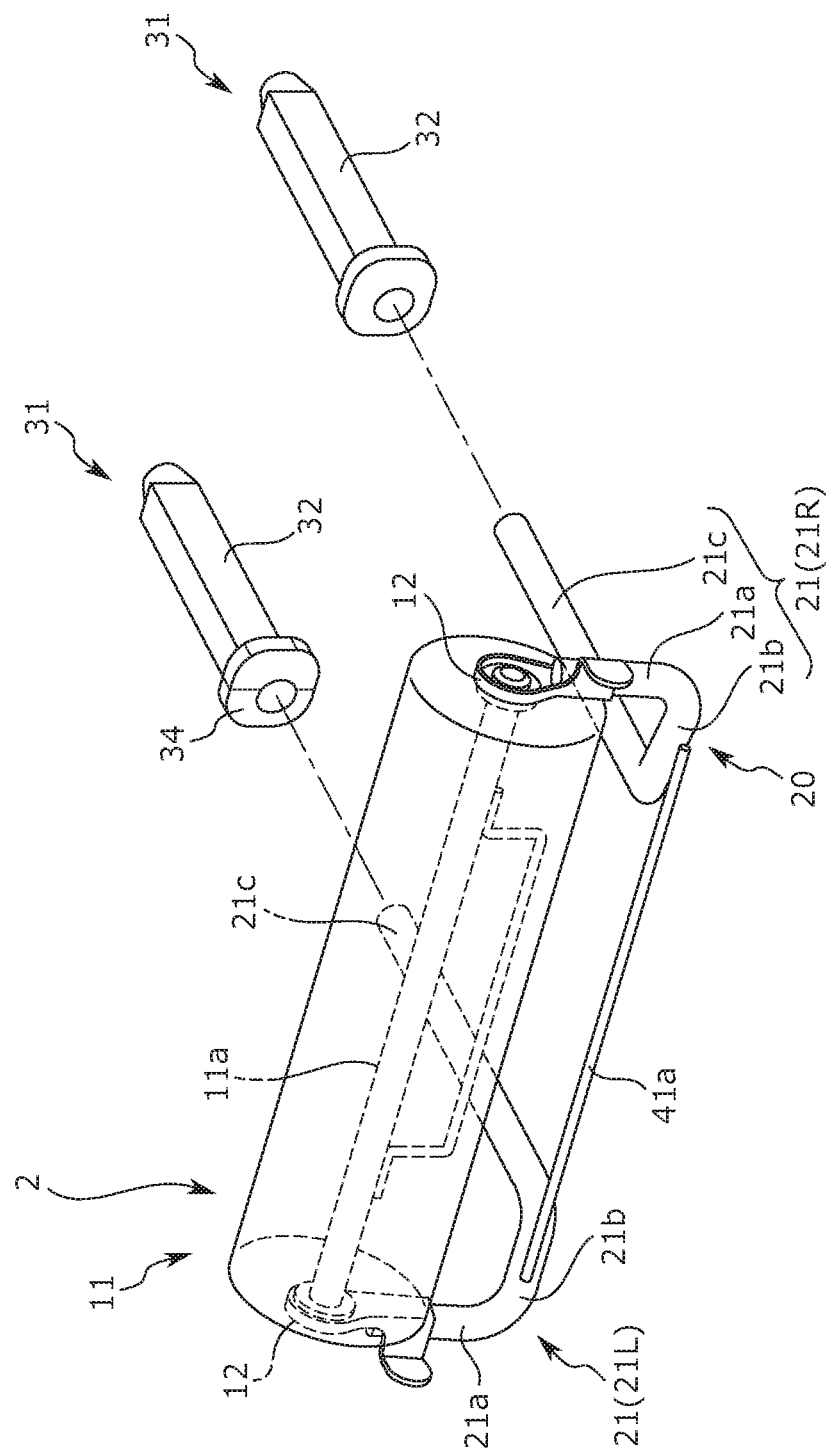
FIG. 3 is a perspective diagram illustrating a movable portion and a guide portion, according to an embodiment.
Figure 4:
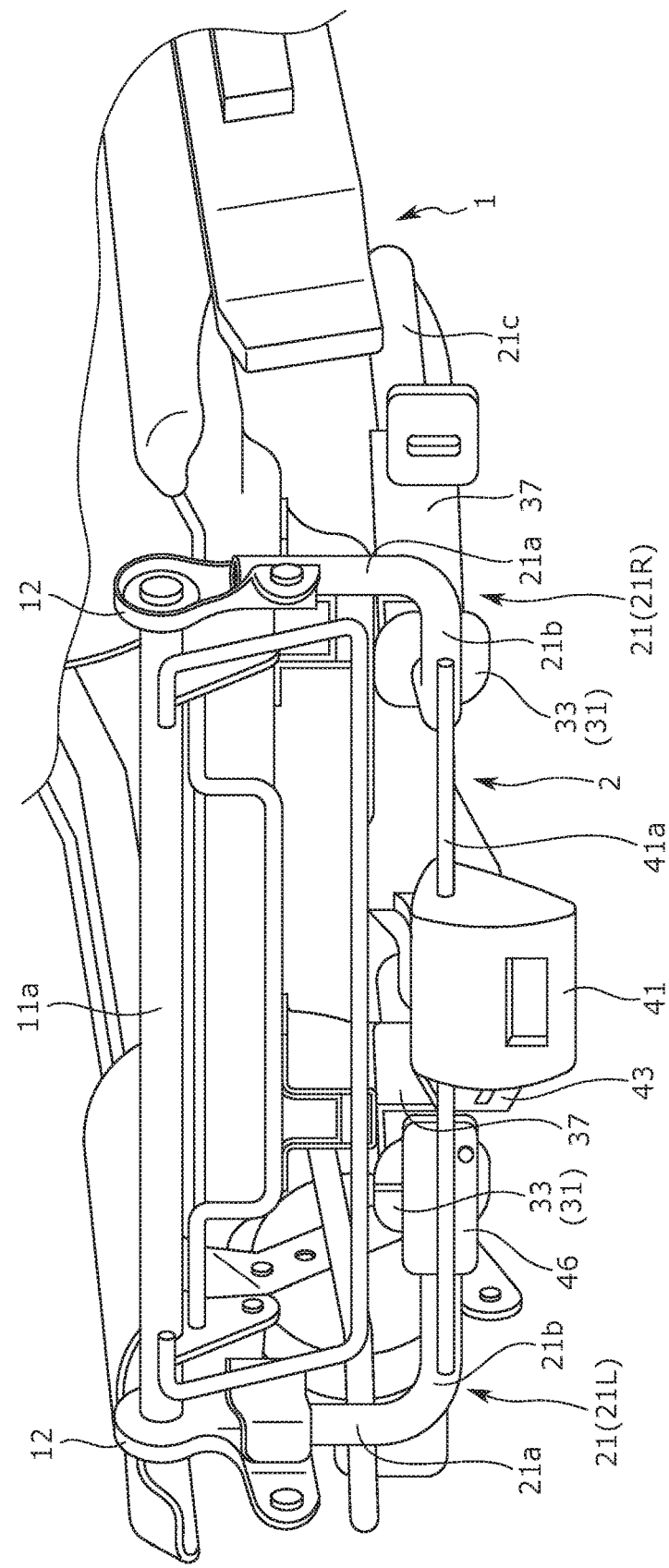
FIG. 4 is a perspective diagram illustrating the movable portion of FIG. 3, where the seat cushion frame is viewed from a front direction, according to an embodiment.

As shown in FIG. 3, the movable portion 2 includes the roller portion 11, a roller support portion 12, and a rod 21. The roller portion 11 is located at a front end portion of the seat cushion S1, more specifically, in front of a front end of the seat cushion frame F1. Further, a core material 11a is arranged in a center portion of the roller portion 11 and the roller portion 11 rotates integrally with the core material 11a.

Figure 5A:
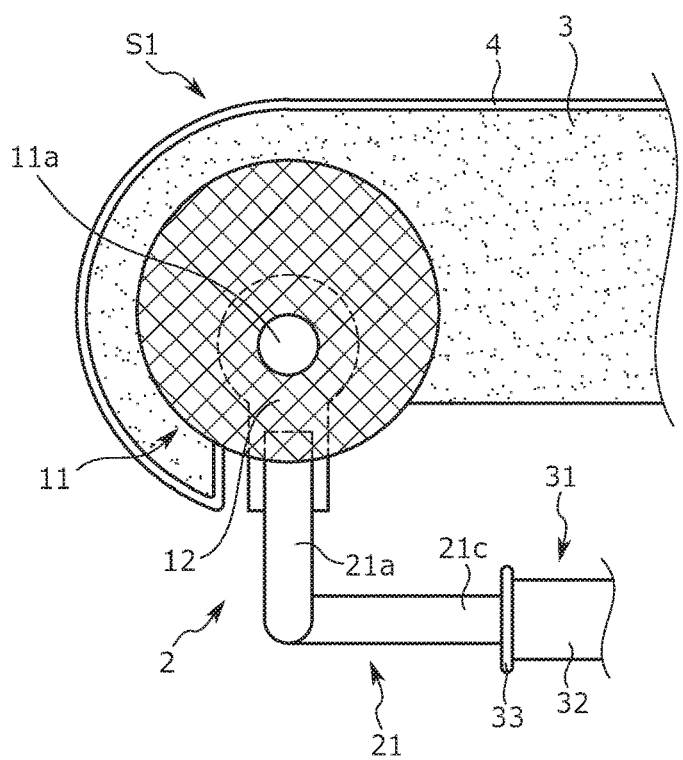
FIG. 5A is a partial schematic diagram illustrating a movement of the movable portion of FIG. 3, where the movable portion is positioned at a back end of a moving range, according to an embodiment.
Figure 5B:
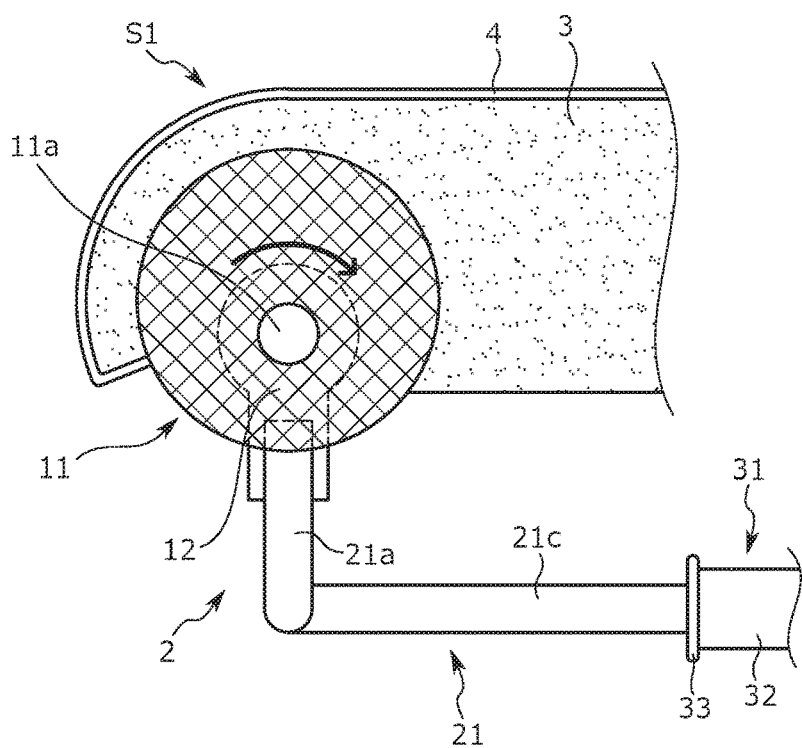
FIG. 5B is a partial schematic diagram illustrating a movement of the movable portion of FIG. 3, where the movable portion is positioned at a front end of the moving range, according to an embodiment.
Figure 6:
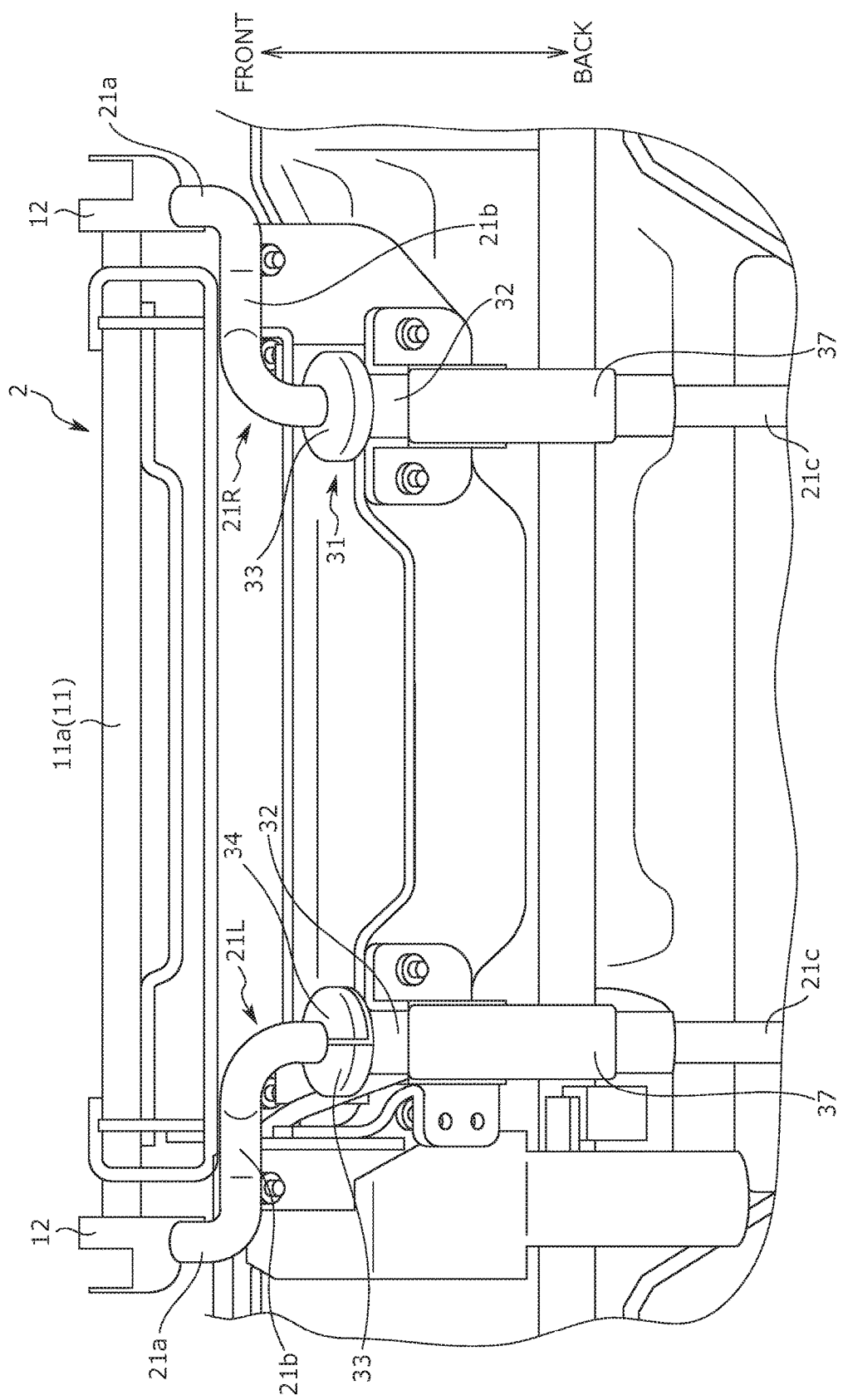
FIG. 6 is a bottom view diagram illustrating a locking mechanism, where a rod and its surroundings are viewed from below, according to an embodiment.

Further, as shown in FIG. 5A and FIG. 5B, the pad material 3 and the cover material 4, located at the front end portion of the seat cushion S1, are wound around an outer peripheral portion of the roller portion 11. Then, the rotation of the roller portion 11 causes a change in a winding amount of the pad material 3 and the cover material 4 on the outer peripheral portion of the roller portion 11.

The roller support portions 12 are configured from brackets arranged near both side ends of the roller portion 11 and rotatably support the roller portion 11 (strictly speaking, end portions of the core material 11a in an axial direction).

The rod 21 is a cylindrical metallic body movable in the front and back direction to change the front to back length of the seat cushion S1. Note that the rod 21 is formed by a cylindrical pipe in the present embodiment, however, the present embodiment is not limited thereto. The rod 21 may be formed by a columnar bar, in other embodiments.

The rod 21 is connected to the roller support portion 12. Then, when the rod 21 is moved in the front to back direction, the roller portion 11 and the roller support portion 12 move integrally with the rod 21. As shown in FIG. 5A and FIG. 5B, this causes changes in a position of the roller portion 11 in the front to back direction and the winding amounts of the pad material 3 and the cover material 4 on the outer peripheral portion of the roller portion 11. As a result, the front to back length of the seat cushion S1 is adjusted.

More specifically, when the rod 21 is at a back end position of its moving range, the roller portion 11 and the roller support portion 12 are at their initial positions shown in FIG. 5A. In such a state, predetermined amounts of the pad material 3 and the cover material 4 are wound around the outer peripheral portion of the roller portion 11. Note that the front to back length of the seat cushion S1 when the roller portion 11 is at the initial position is a normal length (an initial value).

Then, when the rod 21 is moved from the back end position to the front end position of the moving range, the roller portion 11 and the roller support portion 12 move forward to a position shown in FIG. 5B (hereinafter, referred to as an extended position). In this operation, the roller portion 11 rotates with the core material 11a, and accompanied with this, the pad material 3 and the cover material 4 that are wound around the outer peripheral portion of the roller portion 11 are reeled out. This causes the front end portion of the seat cushion S1 to extend and makes the front to back length of the seat cushion S1 slightly longer than the normal length.

Conversely, when the rod 21 is moved from the front end position to the back end position of the moving range, the roller portion 11 and the roller support portion 12 retreat toward their initial positions. As a result, the front to back length of the seat cushion S1 returns to the normal length.

A configuration of the rod 21 is described in detail. In the present embodiment, as shown in FIG. 3 and FIG. 6, the rod 21 includes a first rod 21L and a second rod 21R, which are arranged separated from each other in the seat width direction. The first rod 21L and the second rod 21R are formed in a right and left symmetrical shape relative to a central position of the seat cushion S1 in the seat width direction, and are also symmetrically arranged in the right to left direction.

Further, a front end portion of the first rod 21L is bent towards the second rod 21R in the seat width direction. Similarly, a front end portion of the second rod 21R is bent towards the first rod 21L in the seat width direction.

Specifically, as shown in FIG. 3 and FIG. 4, each of the first rod 21L and the second rod 21R includes a hanging portion 21a, a horizontal extended portion 21b, and a front-to-back extended portion 21c. The hanging portion 21a is located at the front end portion of the rod 21 and extended downward in an up and down direction. Further, an upper end portion of the hanging portion 21a is attached to the roller support portion 12.

The horizontal extended portion 21b is continued with a lower end portion of the hanging portion 21a and extended toward inside in the seat width direction. The front-to-back extended portion 21c is continued with an end portion of the horizontal extended portion 21b inside in the seat width direction, and extended backward in the front to back direction. That is, the rod 21 is bent by substantially 90° at a portion connecting the hanging portion 21a and the horizontal extended portion 21b. The rod 21 is also bent by substantially 90° at a portion connecting the horizontal extended portion 21b and the front-to-back extended portion 21c.

As described above, the first rod 21L and the second rod 21R are bent to shorten a distance between both rods 21 (in other words, in a manner that both rods 21 become close to each other). This provides a reduction in rattling of the rods 21 in motion and prevents the rods 21 in motion from interfering with their surrounding members.

The guide portion 31 for guiding the movable portion 2 when it is moved is arranged at the front end portion of the seat cushion frame F1 (that is, the fixed portion 1). As shown in FIG. 3, the guide portion 31 is a resin molded component having a cylinder-like shape and includes a body portion 32 and a head portion 33. The body portion 32 is a main body portion of the guide portion 31 and is elongated along the front to back direction (that is, the moving direction of the movable portion 2). The head portion 33 is adjacent to a front end portion of the body portion 32 and extended in a flange-like shape.

A through hole penetrating through the body portion 32 and the head portion 33 is formed in the guide portion 31. The front-to-back extended portion 21c of the rod 21 is inserted into the through hole to be freely advanced and retreated. That is, the rod 21 is moved inside the through hole of the guide portion 31 when it is moved in the front to back direction. This allows the rod 21 to appropriately move in the front to back direction while it is guided by the guide portion 31. Further, the guide portion 31 is elongated along the front to back direction, thereby enabling it to appropriately guide the rod 21.

Note that the same number of the guide portions 31 as the number of the rods 21 are provided, and each of the guide portions 31 is arranged at the same position as the front-to-back extended portion 21c of each of the rods 21 in the seat width direction. Further, each of the guide portions 31 is inserted into a guide stay 37 of a square-cylindrical shape welded to a lower surface of the seat cushion frame F1. Thus, as shown in FIG. 6, the guide portion 31 is attached to the fixed portion 1 via the guide stay 37.

Locking Mechanism

The vehicle seat S includes a locking mechanism that locks the above-mentioned movable portion 2 to prevent accidental movement. The locking mechanism is configured from engagement portions each provided to the fixed portion 1 and the movable portion 2. Further, the engagement portion provided to the fixed portion 1 (a fixed portion side engagement portion) is configured to be freely engaged and disengaged with the engagement portion provided to the movable portion 2 (a movable portion side engagement portion). Then, when the fixed portion side engagement portion is engaged with the movable portion side engagement portion, the movable portion 2 is brought into an immovable state (that is, a lock state). In other words, a position where the fixed portion side engagement portion is engaged with the movable portion side engagement portion corresponds to a lock position.

Conversely, when the fixed portion side engagement portion is disengaged from the movable portion side engagement portion to release an engagement state of both engagement portions, the movable portion 2 is brought into a movable state (that is, an unlock state). In other words, a position where the fixed portion side engagement portion is disengaged from the movable portion side engagement portion corresponds to an unlock position.

Configurations of the movable portion side engagement portion and the fixed portion side engagement portion are described below with reference to FIG. 7, FIG. 8A, and FIG. 8B. Note that, in order to comprehensively illustrate the configurations of the movable portion side engagement portion and the fixed portion side engagement portion, components arranged on the peripheries of these engagement portions (e.g., a lock-releasing mechanism) are not shown in FIG. 7, FIG. 8A, and FIG. 8B.

The movable portion side engagement portion is arranged on the rod 21. More specifically, a notch 22 formed on an outer peripheral surface of the front-to-back extended portion 21c of the rod 21 corresponds to the movable portion side engagement portion. As shown in FIG. 7, the notches 22, each formed in a substantially V-like shape, are arranged at fixed intervals in the front to back direction. In this manner, positions of the notches 22 functioning as the movable portion side engagement portion are fixed relative to the rod 21, and the notches 22 are moved integrally with the rod 21.

The fixed portion side engagement portion is arranged on the guide portion 31. More specifically, as shown in FIG. 7, each of the head portions 33 in a pair of the right and left guide portions 31 includes a knob portion 34 forming a portion of an outer edge portion of the head portion 33, a biasing spring 35 set within the head portion 33, and an engagement plate piece 36 energized by the biasing spring 35. The knob portion 34 normally protrudes outside in a radial direction of the head portion 33, but can be pressed inside in the radial direction.

In the head portion 33, the engagement plate piece 36 protrudes inside in the radial direction of the head portion 33. Further, the engagement plate piece 36 can be engaged with the notch 22 formed on the rod 21. That is, the engagement plate piece 36 corresponds to the fixed portion side engagement portion and normally stays at a position where the engagement plate piece 36 is engaged with the notch 22, that is, the lock position, as shown in FIG. 8A.

More specifically, an end portion of the engagement plate piece 36, positioned outside in the radial direction of the head portion 33, is inwardly biased in the radial direction by the biasing spring 35. In this configuration, when the end portion of the engagement plate piece 36, positioned outside in the radial direction of the head portion 33, faces the notch 22 of the rod 21, the engagement plate piece 36 is inserted into the notch 22 to be engaged therewith.

Further, the engagement plate piece 36 can be moved along the radial direction of the head portion 33 in interlocking with the movement of the knob portion 34. Specifically, when the knob portion 34 is inwardly pressed in the radial direction, the biasing spring 35 is compressed (elastically compressed). In this manner, the engagement plate piece 36 moves toward outside in the radial direction and is separated from the notch 22, as shown in FIG. 8B. That is, the engagement plate piece 36 reaches a position separated from the notch 22, that is, the unlock position, when the knob portion 34 is pressed.

Figure 8A:
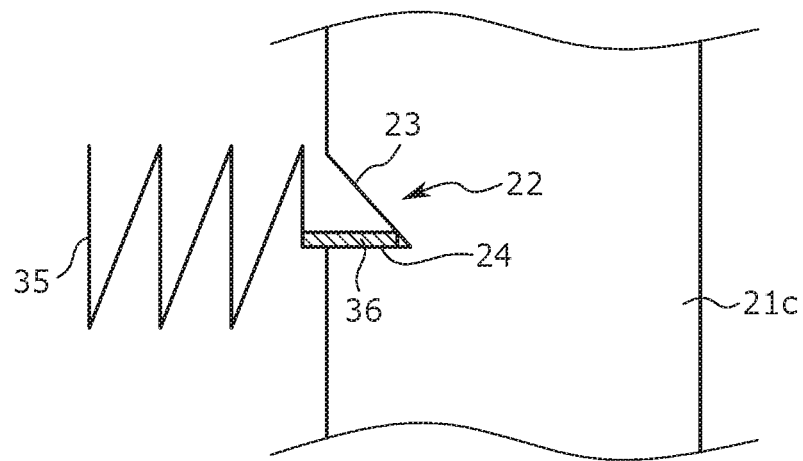
FIG. 8A is a partial schematic diagram illustrating the movable portion side engagement portion and the fixed portion side engagement portion in a lock state, according to an embodiment.
Figure 8B:
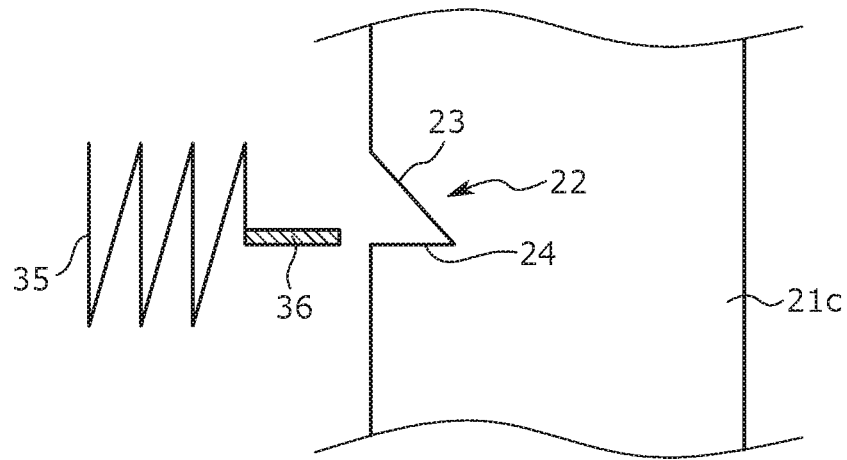
FIG. 8B is a partial schematic diagram illustrating the movable portion side engagement portion and the fixed portion side engagement portion in an unlock state, according to an embodiment.

As described above, the engagement plate piece 36 can be moved between the lock position shown in FIG. 8A and the unlock position shown in FIG. 8B. Then, the engagement plate piece 36 at the lock position is engaged with the notch 22, thereby restricting the movement of the rod 21 in the front to back direction. On the other hand, the engagement state of the engagement plate piece 36 and the notch 22 are released when the engagement plate piece 36 is at the unlock position, thereby allowing the rod 21 to freely move in the front to back direction.

Figure 13:
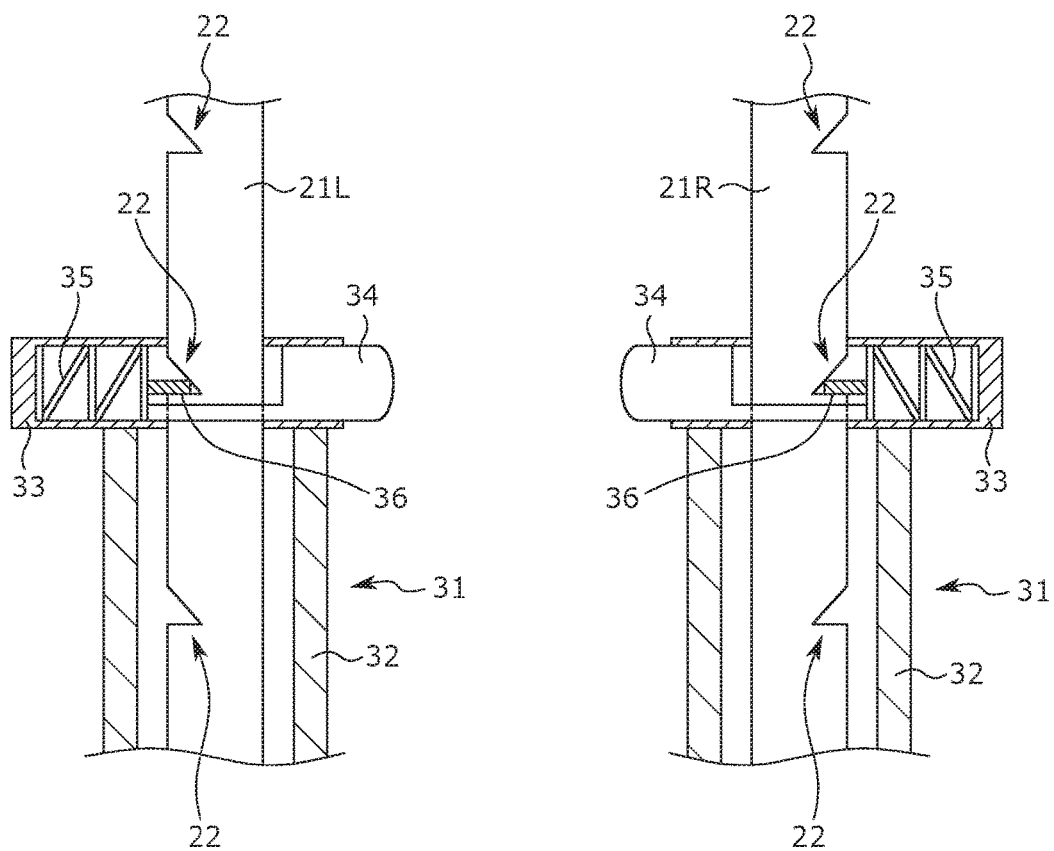
FIG. 13 is a partial schematic diagram illustrating a configuration where a pair of right and left locking mechanisms are provided, according to an embodiment.

Note that, in the present embodiment, only one locking mechanism is provided (only on the left side). Specifically, in the present embodiment, the notch 22 is formed on the first rod 21L positioned on the left side, and the knob portion 34, the biasing spring 35, and the engagement plate piece 36 are provided to the head portion 33 of the guide portion 31 on the left side. However, the present disclosure is not limited thereto, and the locking mechanisms (that is, the combinations of the movable portion side engagement portion and the fixed portion side engagement portion) may be provided at a plurality of locations. Specifically, a pair of right and left locking mechanisms may be provided as shown in FIG. 13. FIG. 13 is a sectional view illustrating a configuration where the pair of right and left locking mechanisms are provided.

An explanation is now given of the configuration shown in FIG. 13. The notches 22 are formed on the front-to-back extended portion 21c of each of the first rod 21L and the second rod 21R, and the knob portion 34, the biasing spring 35, and the engagement plate piece 36 are provided to each of the head portions 33 in a pair of the right and left guide portions 31. Having such a configuration can effectively restrict the movement of the movable portion 2. Note that each portion of the locking mechanisms (specifically, the notch 22, the knob portion 34, the biasing spring 35, and the engagement plate piece 36) has the same configuration as that described above, and each pair of the portions are symmetrically configured right and left.

Further, in the present embodiment, the member (that is, the engagement plate piece 36) moving between the lock position and the unlock position is arranged on the fixed portion 1. Providing the member moving between the lock position and the unlock position to the fixed portion 1 can suppress the increase of the number of components and the weight of the movable portion 2 correspondingly. Further, this also improves the degree of freedom in designing the movable portion 2.

Further, in the present embodiment, the guide portion 31 has the engagement plate piece 36 functioning as the fixed portion side engagement portion. In other words, in the present embodiment, a portion for guiding the movement of the rod 21 and a portion for restricting the movement of the rod 21 are provided to the same member. As a result, in the present embodiment, the locking mechanism is configured in a more simplified manner.

Note that, in the present embodiment, a lock function to the movement of the rod 21 is effective only in one direction of the movement in the front to back direction and ineffective in the other direction of the movement. In other words, when the engagement plate piece 36 is at the lock position, the backward movement of the rod 21 is restricted, while its forward movement of the rod 21 is not restricted. Thus, even when the engagement plate piece 36 is at the lock position, the movable portion 2 including the rod 21 can be moved from the initial position to the extended position.

A configuration of restricting the movement of the rod 21 only in one direction is described below with reference to FIG. 7. As shown in FIG. 7, the notch 22 functioning as the movable portion side engagement portion is formed in a V-like shape. That is, the notch 22 includes in its interior two surfaces facing each other in the front to back direction. These two surfaces are adjacent to each other at a bottom portion of the notch 22.

Figure 7:
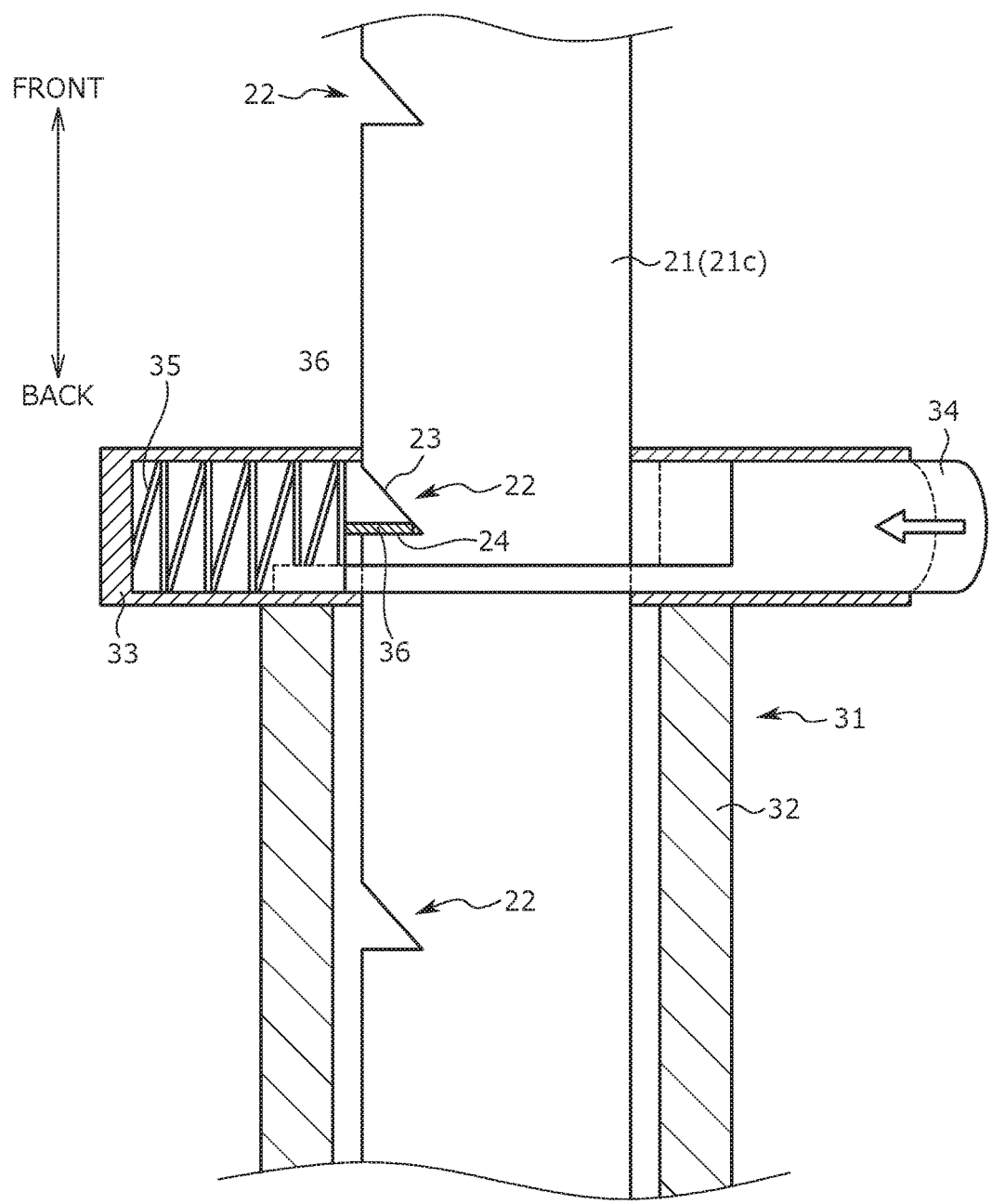
FIG. 7 is a cross-sectional view illustrating configurations of a movable portion side engagement portion and a fixed portion side engagement portion, according to an embodiment.

Further, a surface located on a back side (hereinafter, referred to as a back side end surface 24) between the above two surfaces corresponds to a first surface and is substantially perpendicular to the front to back direction as shown in FIG. 7. In other words, the back side end surface 24 is arranged along a plane having its normal direction in the front to back direction.

On the other hand, a surface located on a front side (hereinafter, referred to as a front side end surface 23) corresponds to a second surface and is formed in an inclined surface as shown in FIG. 7. Strictly speaking, the front side end surface 23 is inclined to be positioned on the outer side in the radial direction of the rod 21 as it goes from its back end to front end. The back end of the front side end surface 23 described herein corresponds to an end of the front side end surface 23 on a side adjacent to the back side end surface 24. Further, the front end of the front side end surface 23 corresponds to an end of the front side end surface 23 at an opposite side to the back side end surface 24.

According to the notch 22 having a shape described above, even when the rod 21 is intended to be moved backward in a situation where the engagement plate piece 36 is at the lock position and engaged with the notch 22, the engagement plate piece 36 abuts, and thus locked by, the back side end surface 24. As a result, the backward movement of the rod 21 is restricted (locked).

In contrast, when the rod 21 is intended to be moved forward in a situation where the engagement plate piece 36 is at the lock position and engaged with the notch 22, the engagement plate piece 36 moves along the inclination direction of the front side end surface 23 without being locked, while still abutting the front side end surface 23. Thus, the forward movement of the rod 21 is not restricted (allowed) even though the engagement plate piece 36 is at the lock position.

Lock-Releasing Mechanism

The vehicle seat S includes a lock-releasing mechanism that unlocks the movable portion 2 to extend the front to back length of the seat cushion S1. Specifically, the lock-releasing mechanism includes a driving portion that moves the engagement plate piece 36 at the lock position to the unlock position by pressing the knob portion 34 provided to the head portion 33 of the guide portion 31 by the driving portion.

Further, lock-releasing operations of the lock-releasing mechanism (specifically, a series of operations of each portion in the lock-releasing mechanism described below) are initiated by a seated person who performs a releasing operation. For this purpose, the lock-releasing mechanism includes an operation portion for receiving a releasing operation performed by the seated person at a predetermined position in the vehicle seat S.

A configuration of the lock-releasing mechanism is described below with reference to FIG. 9 and FIG. 10A to FIG. 10C. Note that FIG. 10A to FIG. 10C are diagrams illustrating steps of the lock-releasing operations, specifically, operations of each component forming the lock-releasing mechanism in order nearest to a component (specifically, an operation lever 41 described below) operated by the seated person.

Figure 9:
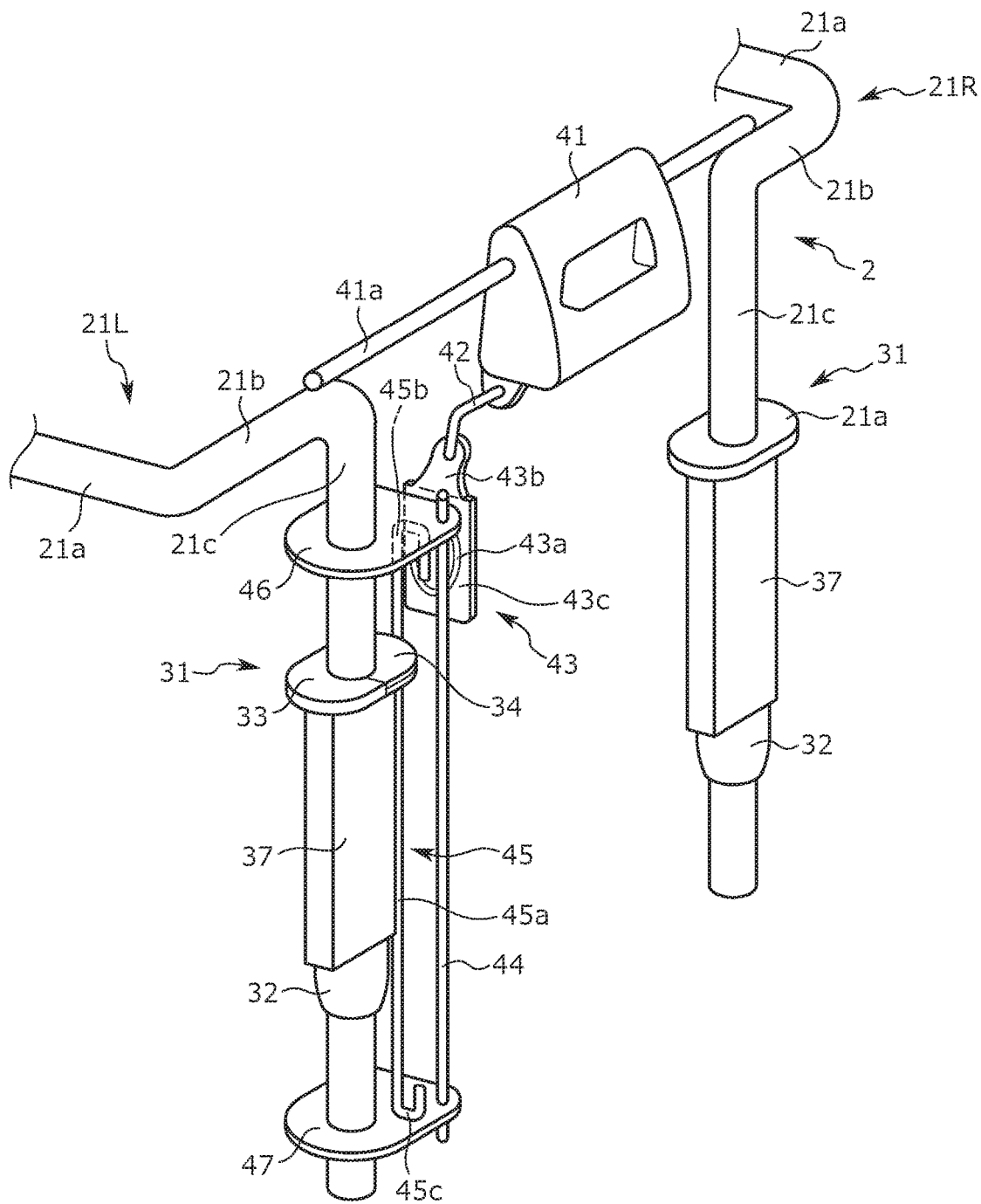
FIG. 9 is a perspective diagram illustrating a lock-releasing mechanism, according to an embodiment.
Figure 10A:
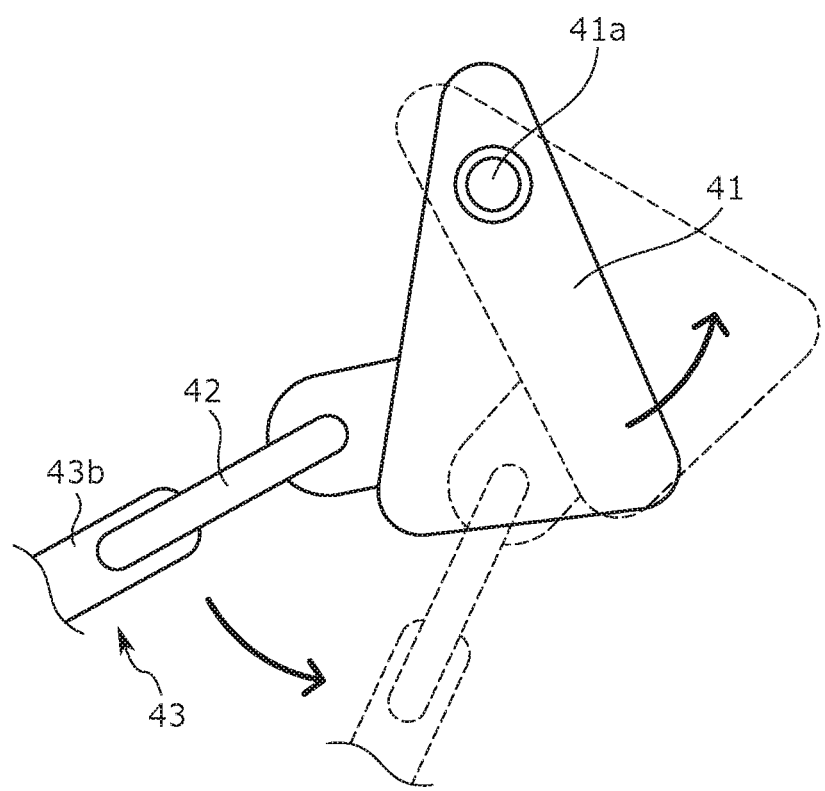
FIG. 10A is a partial schematic diagram illustrating an operation of the lock-releasing mechanism (Part 1), according to an embodiment.
Figure 10B:
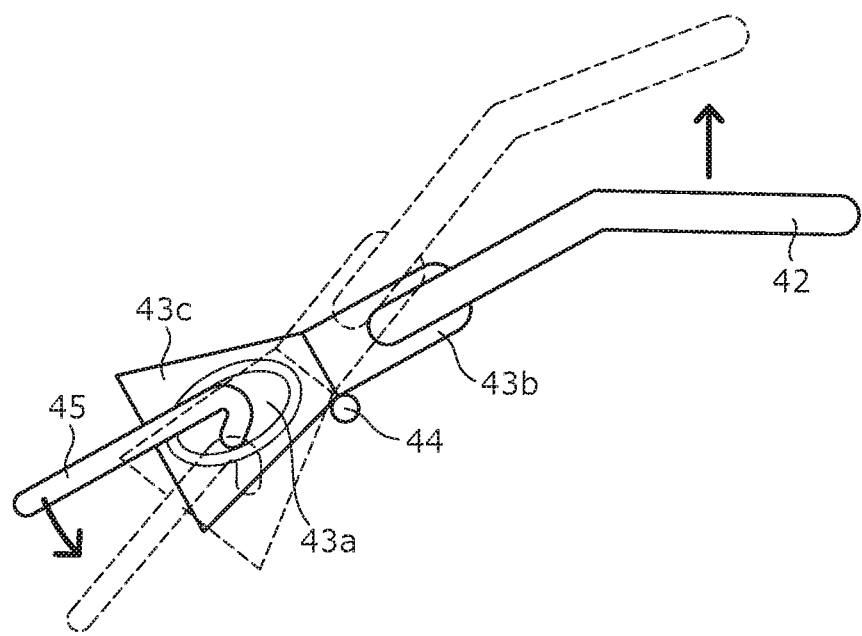
FIG. 10B is a partial schematic diagram illustrating the operation of the lock-releasing mechanism (Part 2), according to an embodiment.
Figure 10C:
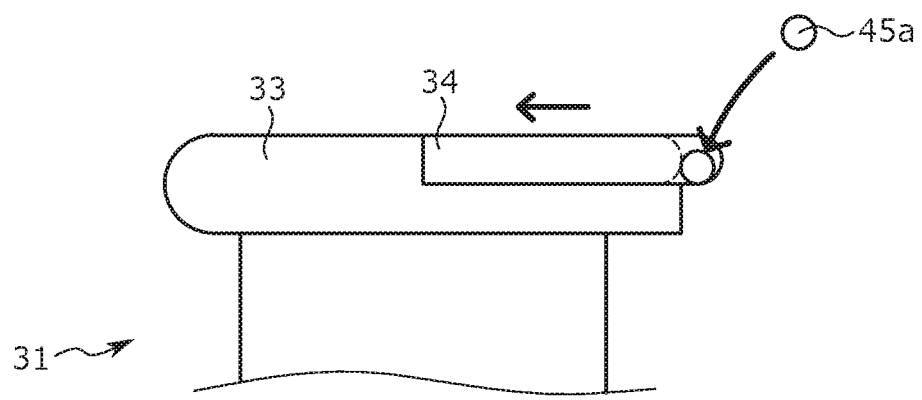
FIG. 10C is a partial schematic diagram illustrating the operation of the lock-releasing mechanism (Part 3), according to an embodiment.

As shown in FIG. 9, the lock-releasing mechanism is configured from the operation lever 41, a connection wire 42, a support bracket 43, a support shaft 44, a pressing wire 45, and shaft fixing brackets 46 and 47. Further, each constituent component of the lock-releasing mechanism is arranged on the movable portion 2.

The operation lever 41, which corresponds to an operation portion, is operated to move the engagement plate piece 36 from the lock position to the unlock position by the driving portion. The operation lever 41 is a resin molding component having a substantially triangular shape in side view, and is attached beneath the front end portion of the seat cushion S1.

More specifically, a rotation shaft 41a is arranged between the horizontal extended portions 21b of the first rod 21L and the second rod 21R. The rotation shaft 41a supports the operation lever 41 and has its axial direction along the seat width direction. Then, the operation lever 41 is attached to each rod 21 with its upper end supported by the rotation shaft 41a.

Further, the operation lever 41 includes a handle on its front lower portion, and when an occupant as the seated person performs an operation of pulling forward the operation lever 41 with a hand placed on the handle, the operation lever 41 rotates around the rotation shaft 41a toward a front side.

The connection wire 42 is a member connected between the operation lever 41 and the support bracket 43, and is attached to a back end portion of the operation lever 41. Further, the connection wire 42 extends toward an outside in the seat width direction, and then further extends, from a midway position of the connection wire 42, obliquely relative to the seat width direction toward a back side. Further, the connection wire 42 moves together with the operation lever 41 when the operation lever 41 is rotated. Specifically, as shown in FIG. 10A, when the operation lever 41 is rotated toward the front side, one end portion of the connection wire 42, attached to the operation lever 41, is pulled up.

The support bracket 43 is a metal plate that supports the pressing wire 45, and is positioned on a back side of the operation lever 41 and also on an outside of the operation lever 41 in the seat width direction. As shown in FIG. 9 and FIG. 10B, the support bracket 43 includes an overhang portion 43b and a support portion 43c. The overhang portion 43b overhangs toward an inside of the seat width direction. An end portion of the connection wire 42, located at a side opposite to the operation lever 41, is fixed to the overhang portion 43b. The support portion 43c is continued with the overhang portion 43b at an outside of the overhang portion 43b in the seat width direction, and includes a flat portion extended in a direction intersecting with the overhanging direction of the overhang portion 43b. The pressing wire 45 is fixed by welding to a surface of the support portion 43c outside in the seat width direction.

Further, the support bracket 43 is supported by the support shaft 44 extended in the front to back direction, and can be swung to the right and left with the support shaft 44 as a center. Specifically, the shaft fixing bracket 46 is installed to each of the front-to-back extended portions 21c of the first rod 21L and the second rod 21R at a position in front of the guide portion 31. Further, the shaft fixing bracket 47 is installed to each of the front-to-back extended portions 21c of the rods 21 at a position behind the guide portion 31. Then, the support shaft 44 is installed between the front side shaft fixing bracket 46 and the back side shaft fixing bracket 47.

The support bracket 43 is swingably supported by a front end portion of the support shaft 44. Then, when the connection wire 42 is moved, the support bracket 43 swings with the movement of the connection wire 42. Specifically, as shown in FIG. 10B, when the end portion of the connection wire 42, attached to the operation lever 41, is pulled up, the overhang portion 43b of the support bracket 43 is also pulled up. This causes the support bracket 43 to swing with the support shaft 44 as a center. The support portion 43c swings and tilts to the outside in the seat width direction.

Note that, as shown in FIG. 10B, the support portion 43c of the support bracket 43 has a reinforcing bead 43a that protrudes outwardly in the seat width direction. The reinforcing bead 43a is formed to improve the rigidity of the support bracket 43.

The pressing wire 45 is a wire member supported by the support bracket 43, which moves the engagement plate piece 36 from the lock position to the unlock position. That is, in the present embodiment, the pressing wire 45 functions as the driving portion.

Specifically, as shown in FIG. 9, the pressing wire 45 is located inside the head portion 33 of the guide portion 31 in the seat width direction, for example, at a position near the knob portion 34. Further, as described above, the pressing wire 45 is held by the support bracket 43. Thus, the pressing wire 45 moves according to the movement of the support bracket 43. More specifically, when the support bracket 43 is swung and causes the support portion 43c to tilt to the outside in the seat width direction, the pressing wire 45 also moves and tilts to the outside in the seat width direction.

When the pressing wire 45 moves and tilts to the outside in the seat width direction, as shown in FIG. 10C, a portion of the pressing wire 45 extended in the front to back direction (a pressing portion 45a) abuts the knob portion 34 to press the knob portion 34 outside in the seat width direction. This compresses the biasing spring 35 set in the head portion 33 of the guide portion 31 to move the engagement plate piece 36 outside in the radial direction. As a result, the engagement plate piece 36 in a state (that is, in a state at the lock position) of being engaged with the notch 22 is released from the notch 22 to reach the unlock position.

As described above, the pressing wire 45 as the driving portion presses the knob portion 34 provided to the guide portion 31 to move the engagement plate piece 36 from the lock position to the unlock position.

Note that the pressing portion 45a, a portion of the pressing wire 45, which actually presses the knob portion 34, is configured from a wire having a cross section of a circular shape. In other words, the pressing portion 45a, which has an outer peripheral surface formed in a circumferential surface, presses the knob portion 34 by putting the outer peripheral surface to the knob portion 34. This configuration allows the pressing portion 45a to appropriately abut the knob portion 34. Specifically, for example, when the knob portion 34 is pressed by an edge of a metal bracket, the metal bracket may bite into the knob portion 34. In order to prevent this, the edge needs to be subjected to a rounding processing or a chamfering processing. In contrast, the pressing portion 45a having a cross section of a circular shape can appropriately abut the knob portion 34 without biting into the knob portion 34 even when the rounding processing or the chamfering processing is not performed.

Further, as shown in FIG. 9, the pressing wire 45 is arranged between the shaft fixing brackets 46 and 47 provided on the front and back sides, and thus positioned in the front to back direction by the shaft fixing brackets 46 and 47. Specifically, a front side bent portion 45b bent in a substantially U-like shape is formed at a front end portion of the pressing wire 45. Similarly, a back side bent portion 45c bent in a substantially U-like shape is formed at a back end portion of the pressing wire 45.

Then, a portion of the front side bent portion 45b facing the shaft fixing bracket 46 abuts a back end surface of the shaft fixing bracket 46. Similarly, a portion of the back side bent portion 45c facing the shaft fixing bracket 47 abuts a front end surface of the shaft fixing bracket 47. In this manner, the pressing wire 45 is positioned in the front to back direction.

Further, the pressing portion 45a has a sufficient length in the front to back direction. Specifically, the length of the pressing portion 45a is slightly longer than a length of the moving range of the rod 21 (in other words, the maximum extension amount of the seat cushion S1). Thus, regardless of any position of the rod 21 in the moving range (in other words, any extension amount of the seat cushion S1), the pressing portion 45a stays near the knob portion 34 to press the knob portion 34.

Next, procedures of lock-releasing operations are described as an example of operations of the lock-releasing mechanism having the above-described configuration. In the lock-releasing operations, the occupant as the seated person performs an operation of pulling forward the operation lever 41 with the hand placed on the handle formed on the front surface of the operation lever 41. As shown in FIG. 10A, this causes the operation lever 41 to rotate around the rotation shaft 41a toward the front side. Then, when the operation lever 41 is rotated toward the front side, the end portion of the connection wire 42, attached to the operation lever 41, is pulled up.

When the connection wire 42 is moved as described above, the support bracket 43 swings with the support shaft 44 as a center as shown in FIG. 10B. Specifically, the support bracket 43 swings and causes the support portion 43c to tilt to the outside in the seat width direction. Then, when the support bracket 43 swings and causes the support portion 43c to tilt to the outside in the seat width direction, the pressing wire 45 also moves and tilts to the outside in the seat width direction.

When the pressing wire 45 moves and tilts to the outside in the seat width direction, as shown in FIG. 10C, the pressing portion 45a of the pressing wire 45 abuts the knob portion 34 to press the knob portion 34 outside in the seat width direction. This compresses the biasing spring 35 set in the head portion 33 of the guide portion 31 to move the engagement plate piece 36 outside in the radial direction. As a result, the engagement plate piece 36 in a state of being engaged with the notch 22 is released from the notch 22 and moved from the lock position to the unlock position.

When the lock is released by the procedures described above, the occupant can move the movable portion 2 backward to shorten the front to back length of the seat cushion S1. Note that, as described above, in the present embodiment, the operation lever 41 is pulled forward to press the movable portion 2 backward. That is, as the operation lever 41 is configured to rotate in the front to back direction with the rotation shaft 41a positioned along the seat width direction as a center, the operation lever 41 moves in substantially the same direction as a direction of the movable portion 2 being pressed backward (a pull-out direction). Thus, the moving direction of the movable portion 2 and the operating direction of the operation lever 41 substantially match with each other. Such a configuration can facilitate the lever operation to move the movable portion 2.

Figure 14:
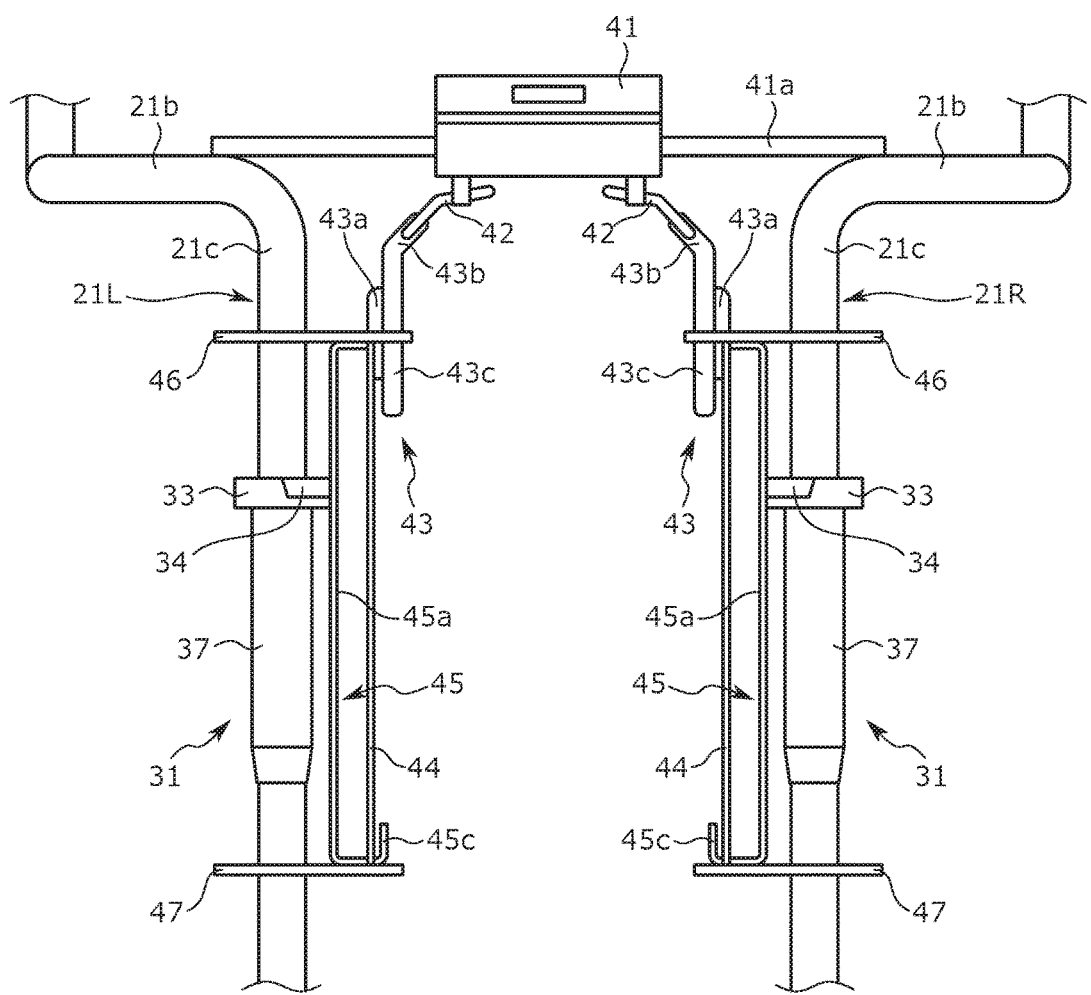
FIG. 14 is a schematic diagram illustrating a configuration where a pair of right and left lock-releasing mechanisms are provided, according to an embodiment.

Note that, in the present embodiment, only one locking mechanism is provided, thus only one lock-releasing mechanism is provided accordingly. However, the present disclosure is not limited thereto. When a plurality of the locking mechanisms are provided, the same number of the lock-releasing mechanisms as that of the locking mechanisms are provided. For example, when a pair of right and left locking mechanisms are provided as shown in FIG. 13, a pair of right and left lock-releasing mechanisms are preferably provided as shown in FIG. 14. FIG. 14 is a diagram illustrating a configuration where the pair of right and left lock-releasing mechanisms are provided.

A configuration shown in FIG. 14 is now described. The components of the lock-releasing mechanisms except for the operation lever 41 (specifically, the connection wires 42, the support brackets 43, the support shafts 44, the pressing wires 45, and the shaft fixing brackets 46 and 47) are symmetrically arranged right and left. Further, the lock-releasing mechanisms are symmetrically configured right and left, where each lock-releasing mechanism has the same configuration as that described above. Then, when the operation lever 41 is operated, the constituent components of the lock-releasing mechanisms provided on the right and left sides simultaneously perform the lock-releasing operations. In this manner, operating one operation lever 41 enables to unlock the pair of right and left lock-releasing mechanisms.

Other Embodiments

In the embodiment described above, the explanation has been mainly given to an example of the configuration of the conveyance seat of the present disclosure. However, the above embodiment is merely to facilitate understanding of the present disclosure and does not limit the present disclosure in any way. That is, the present disclosure can be changed and modified within the scope thereof. Further, it is needless to say that the present disclosure encompasses equivalents thereof.

Figure 11:
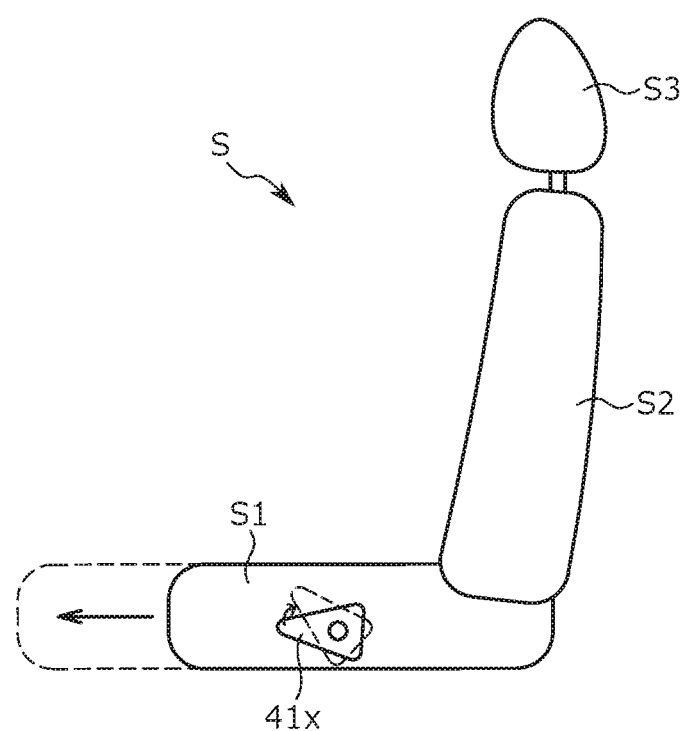
FIG. 11 is a side view diagram illustrating an arrangement position of an operation portion according to a modification, according to an embodiment.

Further, in the above embodiment, the operation portion (specifically, the operation lever 41) that is operated for lock-releasing is installed at the lower surface of the front end portion of the seat cushion S1. However, a position of the operation portion is not particularly limited, and the operation portion may be arranged in front of the seat cushion S1. Alternatively, as shown in FIG. 11, the operation portion (specifically, an operation lever 41x shown in FIG. 11) may be arranged near a side of the seat cushion S1.

Further, in the above embodiment, the locking function is only effective in the backward movement of the movable portion 2, but ineffective in the forward movement. Specifically, the notch 22 formed on the outer peripheral surface of the rod 21 as the movable portion side engagement portion includes the two surfaces facing each other in the front to back direction. Further, between the two surfaces, the back side end surface 24 is substantially perpendicular to the front to back direction, while the front side end surface 23 is inclined to be positioned on the outer side in the radial direction of the rod 21 as it goes from its back end to front end.

However, the present disclosure is not limited to the above configuration, and the front side end surface of the notch may be substantially perpendicular to the front to back direction and the back side end surface may be inclined to be positioned on the outer side in the radial direction of the rod 21 as it goes from its front end to back end. Such a configuration can disable restriction of the backward movement of the movable portion 2, while still restricting its forward movement. Further, the two surfaces of the notch (the front side end surface and the back side end surface) may be both substantially perpendicular to the front to back direction. Such a configuration enables to effectively exhibit the locking function in the forward movement and the backward movement of the movable portion 2.

Further, in the above embodiment, the member, which presses the knob portion 34 to move the engagement plate piece 36 functioning as the fixed portion side engagement portion from the lock position to the unlock position, is configured from the wire. However, the present disclosure is not limited thereto, and, for example, a portion of a bracket member corresponding to the support bracket 43 may be extended toward the knob portion 34, and the knob portion 34 may be pressed by a tip portion, of the bracket member, in its extended direction.

Further, in the above embodiment, the operation lever 41 and the support bracket 43 are connected by the connection wire 42. However, the present disclosure is not limited thereto, and, a portion of the support bracket 43 (e.g., the overhang portion 43b) may be extended to the operation lever 41 to directly connect the support bracket 43 with the operation lever 41.

Further, in the above embodiment, the notch 22 formed on the rod 21 and the engagement plate piece 36 provided to the head portion 33 of the guide portion 31 form the locking mechanism, and the movable portion 2 is locked by the engagement plate piece 36 being inserted into the notch 22. However, the configuration of the locking mechanism is not particularly limited, and, for example, the locking mechanism may be configured in the same manner as a general locking mechanism used in a sliding rail mechanism of a vehicle seat as shown in FIG. 12.

Figure 12:
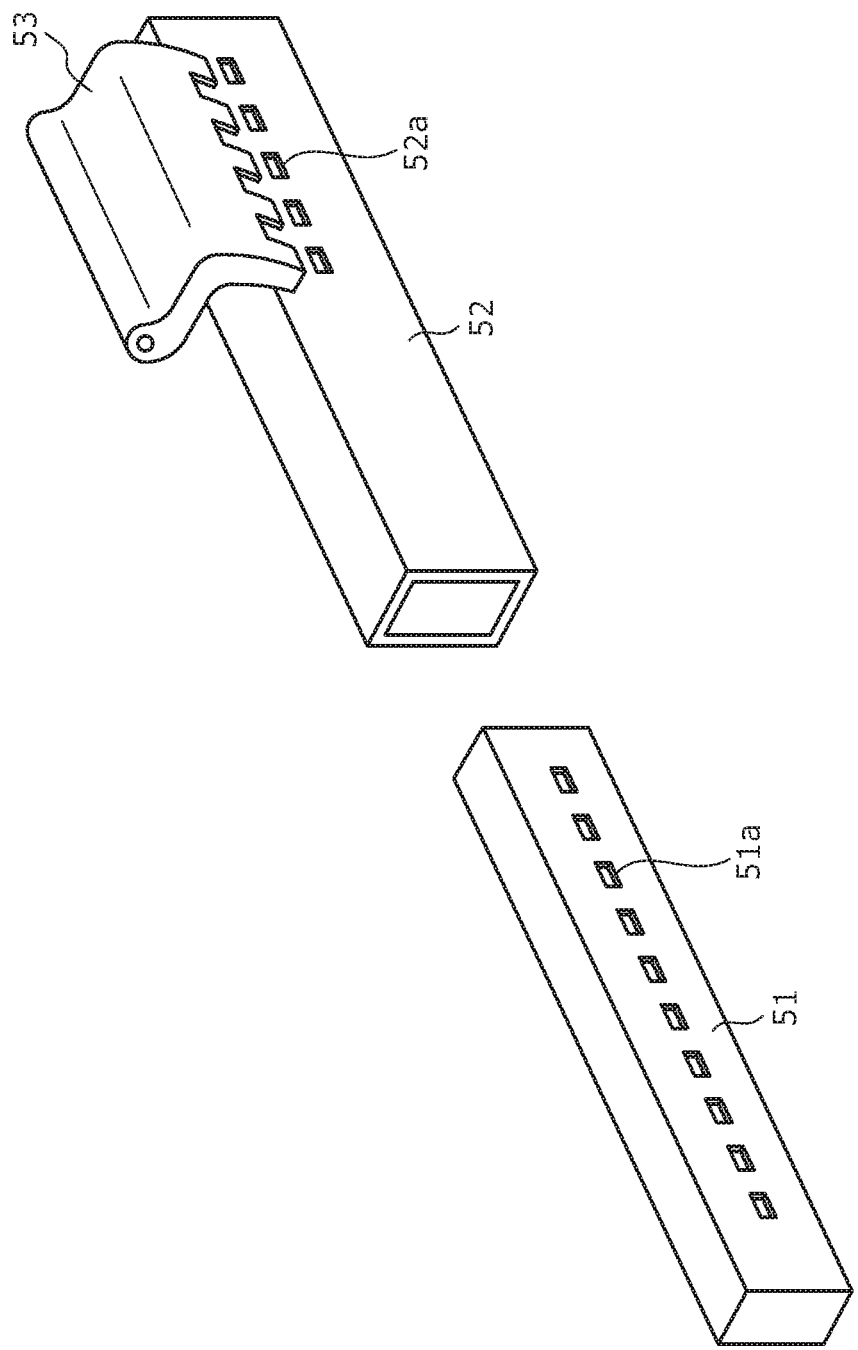
FIG. 12 is a perspective schematic diagram illustrating a locking mechanism according to a modification, according to an embodiment.

An explanation is now given of the locking mechanism shown in FIG. 12. The locking mechanism is configured from a square cylindrical rod 51 corresponding to the rod 21 in the above embodiment, a guide cylinder 52 corresponding to the guide portion 31 in the above embodiment, and a swing member 53 formed in a sideways V-like shape in front view. Through holes 52a are formed at fixed intervals in the front to back direction on a side wall of the guide cylinder 52 that faces the swing member 53. Further, through holes 51a are also formed on a side wall of the square cylindrical rod 51. Then, the square cylindrical rod 51 freely advances and retreats in the guide cylinder 52. Further, when the square cylindrical rod 51 is moved relative to the guide cylinder 52 to align the through holes 52a of the guide cylinder 52 and the through holes 51a of the square cylindrical rod 51 in the front to back direction, both through holes 51a and 52a are in-line (i.e., concentric).

Further, the swing member 53 includes a portion formed in a comb-tooth shape at an end portion thereof outside in the seat width direction. Each tooth faces one of the through holes 52a of the guide cylinder 52 and can be freely inserted in and pulled out from the corresponding through hole 52a. Specifically, when the swing member 53 is swung and approaches the guide cylinder 52, the teeth formed on the end portion of the swing member 53 outside in the seat width direction are inserted into the through holes 52a. Conversely, when the swing member 53 is swung in a direction separating from the guide cylinder 52, the teeth are pulled out from the through holes 52a.

Then, when the teeth of the swing member 53 are inserted into the through holes 52a of the guide cylinder 52 while the through holes 52a of the guide cylinder 52 and the through holes 51a of the square cylindrical rod 51 are in-line, tip portions of the teeth are also inserted into the through holes 51a of the square cylindrical rod 51. In such a state, a front-back movement of the square cylindrical rod 51 can be restricted by the teeth of the swing member 53.

What is claimed is:

1. A conveyance seat, comprising:
   a seat cushion having i) a fixed portion arranged on a seat cushion frame, and ii) a movable portion that is movable relative to the fixed portion for adjustment of a length of the seat cushion, wherein the conveyance seat further includes:
   a movable portion side engagement portion arranged on the movable portion and fixed relative to the movable portion;
   a fixed portion side engagement portion installed on the fixed portion, configured to move between a locking position where the fixed portion side engagement portion engages with the movable portion side engagement portion to bring the movable portion into an unmovable state and an unlocking position where the fixed portion side engagement portion is released from the movable portion side engagement portion to bring the movable portion into a movable state; and
   a driving portion, arranged on the movable portion, for moving the fixed portion side engagement portion from the locking position to the unlocking position.

2. The conveyance seat according to claim 1, wherein respective combinations of the movable portion side engagement portion and the fixed portion side engagement portion are provided at a plurality of positions in a width direction of the conveyance seat.

3. The conveyance seat according to claim 1, wherein:
the movable portion includes a rod movable in the front to back direction to adjust the length of the seat cushion in the front to back direction of the conveyance seat;
the rod is a columnar or cylindrical-shaped member elongated in the front to back direction; and
the movable portion side engagement portion is arranged on the rod.

4. The conveyance seat according to claim 3, wherein:
the rod includes a first rod and a second rod, which are arranged separated from each other in a width direction of the conveyance seat;
the first rod is bent towards the second rod in the width direction; and
the second rod is bent towards the first rod in the width direction.

5. The conveyance seat according to claim 3, wherein:
the movable portion side engagement portion is a notch formed on an outer peripheral surface of the rod;
an interior of the notch includes a first surface and a second surface that face each other in the front to back direction and are arranged adjacently to each other at a bottom portion of the notch;
the first surface extends along a plane having its normal direction in the front to back direction; and
the second surface is inclined to be positioned on an outer side in a radial direction of the rod as the second surface goes from an end of the second surface adjacent to the first surface toward the other end opposite to the first surface.

6. The conveyance seat according to claim 1, wherein:
the fixed portion has a guide portion configured to guide the movable portion when the movable portion is moved; and
the guide portion includes the fixed portion side engagement portion.

7. The conveyance seat according to claim 6, wherein the guide portion is elongated along a moving direction of the movable portion.

8. The conveyance seat according to claim 1, wherein:
the movable portion is movable in the front to back direction of the conveyance seat to adjust the length of the seat cushion;
the conveyance seat includes an operation portion that is operated to move the fixed portion side engagement portion from the locking position to the unlocking position by the driving portion; and
the operation portion, when operated, rotates around a shaft along a width direction of the conveyance seat.

* * * * *